United States Patent [19]

Kawazoe

[11] 4,320,885
[45] Mar. 23, 1982

[54] COUPLING DEVICE

[76] Inventor: Michio Kawazoe, 30-11, 5-chome, Higashi, Narita Suginami ku, Tokyo, Japan

[21] Appl. No.: 238,808

[22] Filed: Feb. 27, 1981

Related U.S. Application Data

[63] Continuation of Ser. No. 38,890, May 14, 1979.

[30] Foreign Application Priority Data

Jan. 22, 1979 [JP] Japan ............................ 54-007062[U]

[51] Int. Cl.³ ........................................... F16M 13/00
[52] U.S. Cl. ............................... 248/222.1; 248/222.4; 248/185; 24/201 R; 24/241 R; 354/126
[58] Field of Search .................... 248/222.1, 222.4, 184, 248/185; 24/201 R, 241 R, 202, 201 C, 201 A; 354/126, 292

[56] References Cited

U.S. PATENT DOCUMENTS

| D. 243,328 | 2/1977 | Kawazoe . | |
|---|---|---|---|
| 2,700,200 | 1/1955 | Buckley | 24/201 R |
| 3,650,190 | 3/1972 | Miyagawa | 354/126 |
| 3,999,055 | 12/1976 | Wakahara et al. | 24/201 R |
| 4,048,488 | 9/1977 | Kawazoe . | |
| 4,080,612 | 3/1978 | Maitani et al. | 354/126 |
| 4,121,799 | 10/1978 | Michio . | |
| 4,123,026 | 10/1978 | Michio . | |
| 4,134,662 | 1/1979 | Kawazoe | 354/126 |
| 4,234,149 | 11/1980 | Kawazoe | 248/184 |
| 4,240,129 | 12/1980 | Kawazoe | 248/222.1 |

Primary Examiner—Victor N. Sakran
Attorney, Agent, or Firm—Donald D. Mon

[57] ABSTRACT

A coupling device for connecting devices such as a strobo, camera, tripod etc., in which only one button or operating lever is needed for engaging and fastening or disconnecting such devices. A stud is fixed on one part of the coupling wheel, the device, button or lever is provided on the other part of the coupling device. The stud on the first part is inserted into a center hole of the second part of the coupling device. By pushing or sliding the button or lever, a lock member engages or releases the stud. Fastening or releasing of devices to be connected is accomplished by rotating the button or lever.

7 Claims, 6 Drawing Figures

COUPLING DEVICE

This is a continuation of application Ser. No. 038,890, filed May 14, 1979.

This invention relates to a coupling device for connecting devices such as a stroboscope, a camera, a stroboscope grip, a camera holder (i.e., camera supporting bracket), a tripod etc.

The inventor of the device herein disclosed and described is the inventor of the device disclosed and described in U.S. Pat. No. 4,240,129 issued Dec. 16, 1980 for attaching a strobo to a camera. However the device disclosed in U.S. Pat. No. 4,240,129 issued Dec. 16, 1980 employs two buttons or levers for operation (i.e. engaging and clamping respectively). However, the construction disclosed in the above identified patent is somewhat complicated and the operation of the device can be troublesome due to the two operating levers. Moreover some skill is required for operation of each lever of the device so that misoperation can occur.

BRIEF SUMMARY OF THE INVENTION

It is one object of the invention to provide a coupling device for connection of devices such as a strobo, a camera, a tripod etc. in which only one lever or button is needed for the operation of engaging and clamping these devices.

Another object of the invention is to provide a coupling device for connecting two devices such as a strobo, camera, tripod etc. at a fixed desired relative angle.

Other objects and advantages will be apparent from the following explanation when considered in conjunction with the accompanying drawings.

DETAILED DESCRIPTION

Figure 1:
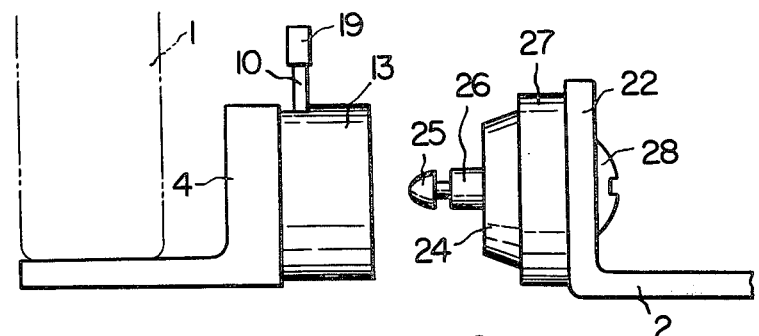
FIG. 1 is a side elevation of the coupling device according to the invention as used to connect a strobo grip and a camera supporting bracket in a separated condition.

FIGS. 1-4 show one embodiment of the present invention as used for connecting a strobo or flash grip and a camera mounting or supporting bracket. The first holder or bracket which may be for either the strobo support or the camera support has a hole or socket 3. In the drawing, the first holder or bracket 4 is shown with the strobo grip 1. A second holder 13 having a center hole 12 is secured to the first holder 4 by recess 14. A clamp member 7 having a center hole 5 is rotatably positioned between said first holder 4 and second holder 13 with the center hole 5 aligned with center hole 12. A locking lever or member 11 having a large release hole 8, a locking recess 9, and an operating extension or part 10 slidably fits into guide recess slots 6 of the clamp member 7 at right angles to the axis of the center hole 7 and 12. A spring 16 in the socket hole 3 biases the clamp member 7 against the second holder 13 through washer 18. Four cam faces 21b, 21b, 21c, 21c of cam means 21 are formed on opposing faces of said second holder 13 and clamp member 7. Cam faces 21b, 21b are concave and cam faces 21c, 21c are convex. The cam faces 21b and 21c are connected by inclined face 21a. Similar cam faces are also provided on the opposing face of said clamp member 7 and they conform with each other. The lock member 11 is biased upwardly by spring 15 which is secured to the lock member 11 by pin 17. A button 19 is provided at the end of said operation extension part 10 and extends through recess 29 of the second holder 13. The recess 29 is in the shape of a sector so as to allow rotational movement of the operating extension part 10.

Figure 2:
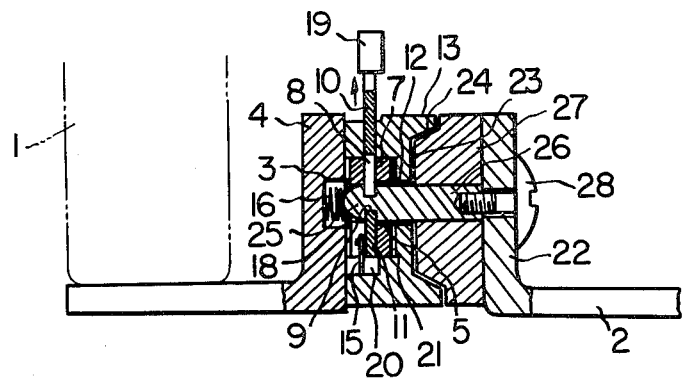
FIG. 2 is a cross sectional view of the coupling device shown in FIG. 1 in a connected condition.
Figure 4A:
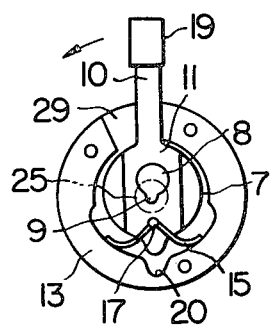
FIGS. 4(a), (b) and (c) are views illustrating the operation and action of the essential parts of the present invention.
Figure 4B:
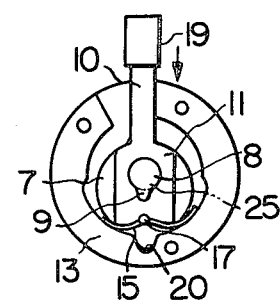
Figure 3:
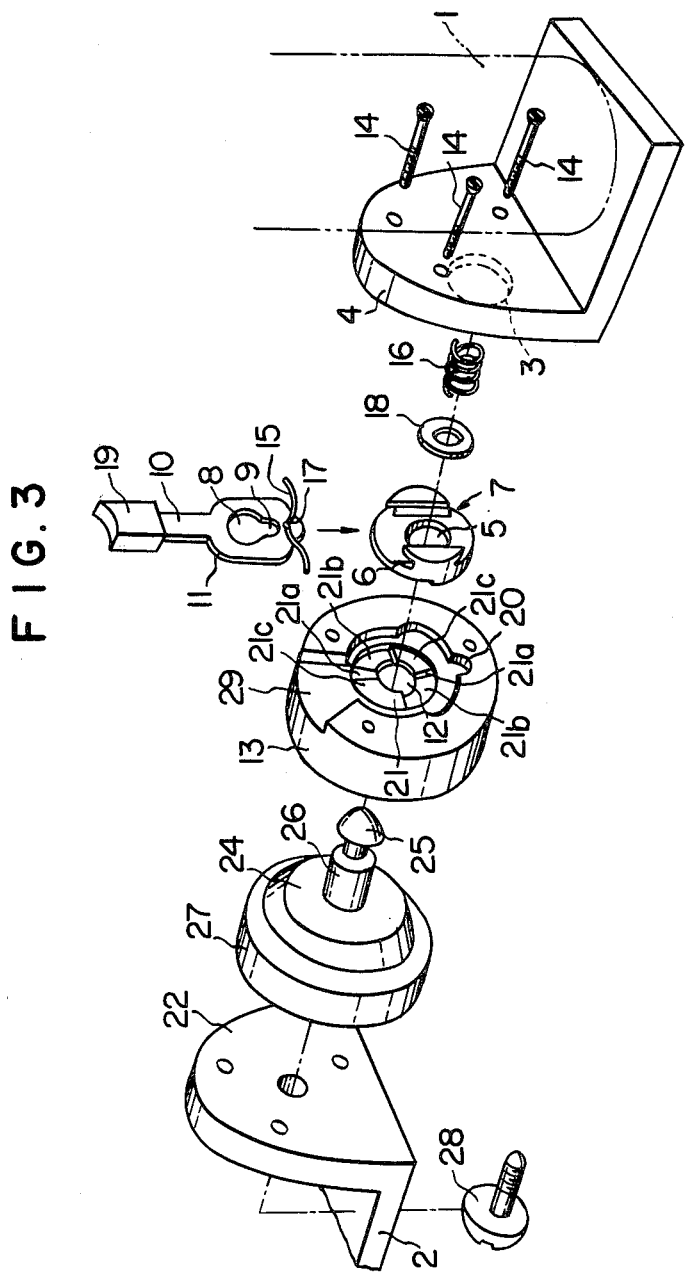
FIG. 3 is an exploded perspective view of the coupling device.

A third holder or bracket 22 is provided for either a strobo grip 1 or camera attached to supporting bracket 2. In this case the third holder 22 is shown on a camera supporting bracket 2. A jack 27 is secured to the holder 22 by screw 28. The jack 27 has a projection 24 which is inserted into the depression 23 of said second holder 13 as shown in FIG. 2 and engages by friction the contacting faces. At the center of said projection 24, a stud 26 having a round head 25 and an annular recess which is fixed when it is inserted into said center hole 12, 5 and large hole 8 by engaging with said recess 9. A rubber face may be provided on the contacting face of jack 27 and second holder 13. A recess 20 is provided in the second holder 13 for relieving the protrusion on the lower end of lock member 11. The operation of said device is as follows:

For connecting said coupling device, the button 19 and lock-member 11 is pressed downwardly in FIGS. 1-3, against the force of spring 15, the large hole 8 is aligned with the center holes 12, 5 as shown in FIG. 4(b) and the said stud 26 is inserted into said holes 12, 5, 8. Thus release of the button 19, the lock member 11 rises by the force of spring 15 as shown by arrow in FIG. 2 and recess 9 engages the annular recess of stud 26 as shown in FIG. 2 and FIG. 4(a). In this state, camera supporting bracket 2 can not be separated from the first holder 2 because of the engagement of stud 26 and lock member 11. However, the head 25, lock member 11 are pressed by the spring 16 to the right as shown in FIG. 2, and projection 24 do not contact the depression 23 allowing bracket 2 to rotate with holder 22 or vice versa. Therefore continuous adjustment of the direction of the camera against the strobo is possible and freely enables bounce photography. By securing bracket 2, continuous adjustment of the direction of the strobo against the camera also freely enables bounce photography.

Upon the completion of any adjustment, the button 19 and the operating extension part 10 is rotated to the clamping direction shown by the arrow in FIG. 4(a). The clamp member 7 rotates and moves to the left as shown in FIG. 2 by engagement of cam surfaces 21a, 21b, 21c against the force of spring 16, lock member 11 and stud 26. Jack 27 is also moved in the left direction in FIG. 2 through the engagement of recess 9 and head 25 which causes the projection 24 of the jack 27 to press and contact the depression 23 of the second holder 13 and firmly fixing bracket 2 to the first holder 4 by the frictional force between said projection 24 and depression 23. They are completely locked when said lock member 11 and operating extension part 10 reach the rotational position shown in FIG. 4(c).

Figure 4C:
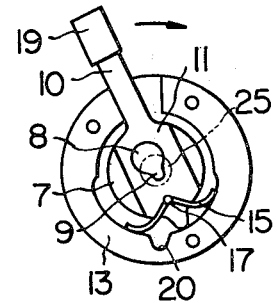

For changing the relative direction of strobo and camera, the button 19 is rotated in the direction shown by arrow in FIG. 4(c), causing the clamp member 7 to rotate in the reverse direction pushing the stud 27 to the right as shown in FIG. 2 by the force of spring 16 and the frictional force between said projection 24 and depression 23 is released. Therefore, the relative direction of a strobo and a camera can be adjusted. When the button 19 is rotated in the direction shown by arrow in FIG. 4(a), said projection 24 is again fastened to the depression 23 by frictional engagement.

For removing the strobo from the camera, said button 19 is rotated to the position shown in FIG. 4(a), then pushed downwardly as shown by the arrow in FIG. 4(b) against the force of spring 15. The recess 9 of lock member 11 disengages from the annular recess of said stud 26, allowing the stud to be removed from the center hole 12, 7 and large hole 8.

As explained above, in the present invention, the relative direction between the camera and the strobo may be continuously adjusted allowing bounce photography in a desired angle between the camera and the strobo. Moreover, it is possible to couple or separate, fasten or loosen the camera and the strobo by easy operation of a single button.

In said embodiment of the present invention it is applied to connecting a strobo grip to a camera supporting bracket, that is a camera holder. However, it is apparent that with the present invention is also possible to connect a camera and a strobo. a camera and a tripod or a unipod, a camera holder and a strobo, a strobo and a tripod, a strobo grip and a camera, etc.

In said embodiment, the devices to be connected are connected in a horizontal axis but it is also possible to connect said devices in a vertical axis. For example when the present invention is applied to a connection between a camera and a tripod, said first holder 4 will be the horizontal upper frame of the tripod while on the other hand, the bracket 2 will be the lower frame of the camera body. Said stud 26 will be provided on the lower face of the camera body and extend downwardly while said second holder 13 will be provided on the upper horizontal face of the tripod and operating part 10 will extend in a horizontal plane. In this construction, the camera is engaged or released from the tripod by a pushing operation of the button 19 and the camera is fastened or loosened by rotating operation of the button. The operator may adjust the angle or direction of the camera by moving only one button.

In said embodiment, it is also possible to form a tapered face at said recess 9 which is pushed by the head 25, so that the stud 26 can be inserted into the large hole 8 without pushing the button 19. The round head 25 obviously may be replaced by a conical head and accomplish the same purpose.

This invention is not to be limited by the embodiments shown in the drawings and described in the description which are given by way of example and not of limitation, but only in accordance with the scope of the appended claims.

I claim:

1. A coupling device for connecting devices such as a strobo, camera, a tripod etc. comprising first holder being provided on one of said device to be connected, second holder having a center hole being fixed to said first holder, a clamp member having a center hole being inserted rotatably between said first holder and second holder, a locking member having a large hole for inserting and recess for locking being inserted slidably into said clamp member, a spring for urging said clamp member against second holder, a cam means provided at the opposing faces of said second holder and clamp member, a holder being provided on the other of said devices to be connected, the holder engages with said second holder by friction, and a stud provided on the holder to be inserted into said center holes and a large hole having a head engaged with said recess of the lock member, characterized in that the lock member gives engaging or releasing action with said stud by sliding movement and the lock member gives fastening or loosening action through the cam action between said second holder and clamp member.

2. A coupling device as claimed in claim 1 in which a spring means for biasing said lock member upwardly being provided.

3. A coupling device for connecting a strobo to a camera or the like comprising:
   a first holder;
   a second holder having a center hole secured to said first holder;
   a clamp member rotatably inserted between said first and second holders, said clamp member having a center hole in alignment with the center hole in said second holder;
   locking lever means engaging slots in said clamp member, said locking lever having a center with a locking recess;
   biasing means for biasing said clamp member and lever means against said second holder;
   said clamp member and said second holder having mutually opposed cam surfaces;
   a third holder having a stud with an annular recess near the end;
   said stud adapted to pass through the holes in said second holder, clamp member and said lever means; and
   lever biasing means for biasing the recess in the center hole of said lever means into engagement with the annular recess in said stud whereby said third holder is fastened to said second holder.

4. The coupling device according to claim 3 wherein said second holder has a recess in the form of a sector;
   said lever means having an extension extending outwardly through the recess in said holder,
   said lever means adapted to rotate said clamping member whereby said mutually opposed cam surfaces force the second and third holders into frictional engagement locking them in a selected rotational position.

5. The coupling device according to claim 4 including locking means for locking said lever means in a rotated position.

6. The coupling device according to claim 5 wherein said locking means comprises a protrusion on the lower end of lever means which forces said lever outwardly against a cam surface on said second holder preventing the recess in the center hole of the lever from disengaging from the annular recess in said stud.

7. The coupling device according to claim 6 wherein the cam surface of the second holder engaging the protrusion on the lever means includes a recess for relieving the protrusion to permit release of the annular recess of the stud from the recess of the lever.

* * * * *